United States Patent Office
2,835,651
Patented May 20, 1958

2,835,651

ORGANOSILICON COMPOSITIONS CONTAINING PHOSPHORUS AND THEIR PREPARATION

Alfred R. Gilbert and Frank M. Precopio, Schenectady, N. Y., assignors to General Electric Company, a corporation of New York No Drawing. Application February 19, 1954
Serial No. 411,566

18 Claims. (Cl. 260—46.5)

This invention is concerned with a process for making organosilicon compositions containing phosphorus attached to silicon through aliphatic carbon. More particularly, the invention relates to a process for making an organosilicon composition containing phosphorus attached to silicon through aliphatic carbon, which process comprises effecting reaction between (1) phosphorus trichloride, (2) oxygen and (3) an organosilicon compound containing at least one alkyl radical attached to silicon. The invention also includes compositions prepared in accordance with the process described above.

Organosilicon compounds containing phosphorus bonded to silicon through aliphatic carbon are unknown in the art. This may be explained by the fact that neither phosphorus trichloride alone nor phosphorus oxychloride alone nor a mixture of phosphorus trichloride and phosphorus oxychloride will add to an organosilicon compound containing an alkyl radical to form an organosilicon compound containing phosphorus attached to silicon through aliphatic carbon. We have discovered that an organosilicon compound containing phosphorus attached to silicon through aliphatic carbon may be formed by reacting an alkyl silicon compound with both phosphorus trichloride and oxygen. The reaction is believed to proceed according to the following equation:

(1)
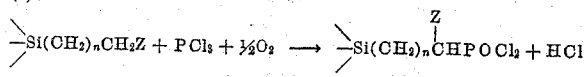

where $n$ is a whole number from zero to 10, inclusive, and preferably is a whole number from zero to 4, inclusive, and Z is hydrogen or an alkyl radical, e. g., methyl, ethyl, propyl, butyl, octyl, decyl, etc. radicals.

The types of organosilicon compounds containing an alkyl radical attached to carbon which may be employed in the practice of the present invention are numerous, and for purposes of brevity such an organosilicon compound will be hereinafter referred to as the "alkyl silicon compound." One type of alkyl silicon compound which may be employed comprises compounds corresponding to the general formula:

(2)
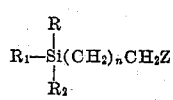

where R and $R_1$ are the same or different members of the class consisting of alkyl radicals, e. g., methyl, ethyl, propyl, butyl, etc., radicals; aryl radicals, e. g., phenyl, diphenyl, etc., radicals; alkaryl radicals, tolyl, xylyl, etc., radicals; aralkyl radicals, e. g., benzyl, phenylethyl, etc., radicals; and halogenated aryl radicals, e. g., chlorophenyl, dichlorophenyl, tetrachlorophenyl, etc., radicals; $R_2$ is a member of the class consisting of hydrogen, hydrocarbon radicals as defined for R and $R_1$; and hydrolyzable groups, for example, alkoxy radicals, e. g., methoxy, ethoxy, propoxy, butoxy, etc., radicals; aryloxy radicals, e. g., phenoxy, etc., radicals; halogen, e. g., chlorine, fluorine etc., acyloxy radicals; and $n$ and Z are as defined above.

The alkyl silicon compounds of Formula 2 may be reacted with phosphorus trichloride and oxygen to form compounds of formula:

(3)
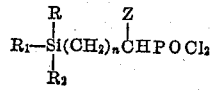

where R, $R_1$, $R_2$, Z and $n$ are as defined above. Compounds within the scope of Formula 3 include, for example, $(CH_3)_3SiCH_2POCl_2$
$(C_2H_5)_3SiC_2H_4POCl_2$
$(C_6H_5)(CH_3)_2SiCH_2POCl_2$
$(CH_3)_2(Cl)SiCH_2POCl_2$
$(C_2H_5)_2(Cl)SiC_2H_4POCl_2$
$(C_2H_5)_2(CH_3)SiCH_2POCl_2$
$(C_4H_9)_3SiC_4H_8POCl_2$
$(ClC_6H_4)_3SiC_4H_8POCl_2$
$(C_2H_5)_2(C_2H_5O)SiC_2H_4POCl_2$ In addition to the alkyl silicon compounds described above which contain a single silicon atom, our invention is also applicable to alkyl silicon compounds containing a plurality of two or more silicon atoms connected directly to each other (polysilane compounds) and containing alkyl radicals attached directly to silicon.

Besides the monosilane and polysilane compositions containing alkyl radicals attached directly to silicon, we also may employ organopolysiloxanes (either linear, branch-chained, cyclic, etc.) containing an alkyl radical attached directly to silicon. Cyclic organopolysiloxanes which we may employ have the formula:

(4)
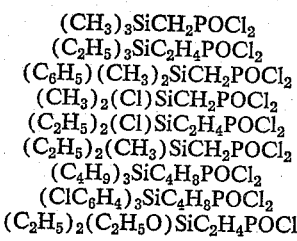

where R, Z and $n$ have the meanings given above and K is an integer greater than 2, e. g., from 3 to 6 or more. For example, the cyclic organopolysiloxane may be the tetramer or pentamer of dimethylsiloxane or methylphenylsiloxane.

Among the relatively short-chain linear polysiloxanes which may be used in the practice of the present invention may be mentioned, for example, hexamethyldisiloxane, hexaethyldisiloxane, octamethyltrisiloxane, octaethyltrisiloxane, etc.

Longer chain organopolysiloxanes of linear character may also be employed, as for instance the linear chain-stopped polysiloxanes, having alkyl radicals attached to silicon, many examples of which are disclosed in Patnode Patents 2,469,888 and 2,469,890. A specific class of polymeric compounds within the scope of the present invention are those containing the unit:

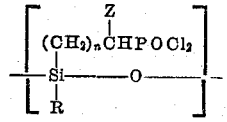

by itself or intercondensed with other organosiloxane units, where R, Z, and $n$ have the meanings defined above.

In general, the process of the present invention is carried out by merely mixing the alkyl silicon compound (whether it be a monosilane, or a polysilane, or an organopolysiloxane) with phosphorus trichloride and bubbling oxygen through the resulting mixture. An advantage of our process is that no heat or superatmospheric pressure is necessary to carry out the reaction; such conditions are, however, not precluded. We have found it advantageous to carry out the reaction at temperatures slightly below room temperature, for example, from about 0° C. to 20° C. By the process of our invention, more than one —$POCl_2$ radical may be added to a single alkyl radical, and —$POCl_2$ radicals may be added to more than one alkyl radical attached to the same silicon atom. The degree of —$POCl_2$ substitution can be controlled by the ratios of phosphorus trichloride and oxygen to alkyl radicals attached to silicon in the reaction mixture. In general, when one mole of $PCl_3$ is used per mole of silicon-bonded alkyl radical, one —$POCl_2$ radical will be substituted per alkyl radical. When excess phosphorus trichloride and oxygen are used, a mixture of products is obtained with both mono- and polysubstitution of —$POCl_2$. It will be obvious to a person skilled in the art that an unlimited variation of the proportion of reactants is possible, the proportion being dependent entirely on the degree of —$POCl_2$ substitution desired. In the practice of our invention we have used from about 1.0% to 1000% $PCl_3$ based on the weight of alkyl silicon compound. The amount of oxygen employed (e. g., by bubbling it through the mixture of alkyl silicon compound and phosphorus trichloride) is not critical. Advantageously, at least one-half mole of oxygen should be employed for each mole or silicon atom; since under most conditions some unreacted oxygen escapes from the system, it is desirable to use a molar excess of oxygen.

Our process has been found to be an advantageous method of forming organopolysiloxane gums, since a controlled amount of phosphorus may be introduced into a chain-stopped linear polysiloxane oil to form an oil containing phosphorus bonded to silicon through aliphatic carbon. These phosphorus-containing oils will cross-link upon standing in air or upon being hydrolyzed to form a gum which may be compounded into a rubber containing excellent physical properties. The degree of cross-linking can be controlled by the number of phosphorus atoms incorporated into the oil. This method of forming organopolysiloxane gums is advantageous in that the gum may be made from readily available linear chain-stopped oils instead of requiring the cyclic organopolysiloxanes which are used in the usual gum formation processes. However, a gum may be formed by the process of the present invention from cyclic organopolysiloxanes such as octamethylcyclotetrasiloxane which has been reacted with phosphorus trichloride and oxygen.

The following examples are illustrative of the practice of our invention and are not intended for purposes of limitation.

Example 1

A solution of 274.5 g. (2.0 moles) of phosphorus trichloride and 44 g. 0.5 mole) of tetramethylsilane was cooled to 5° C. and added to a three-neck round-bottomed flask equipped with a thermometer, Dry Ice condenser, and gas dispersion tube for oxygen addition. Over a period of five and one-half hours, a slow stream of oxygen was introduced into the solution while the temperature was maintained between 4° C. and 14° C. by means of an ice bath. Subssequently, the volatiles were removed by flash vacuum distillation, leaving a residue of 55.0 g. This residue was fractionally distilled yielding 23.2 g. of $(CH_3)_3SiCH_2POCl_2$ which boiled between 102.8° C. and 103.5° C. at 51 mm. Chemical analysis showed the product to contain 35.8% chlorine, as compared with the theoretical value of 34.6% chlorine.

Example 2

A total of 5.0 g. of phosphorus trichloride was added to 169.4 g. of a linear, trimethylsilyl chain-stopped methyl silicone oil such as is described in Patnode Patent 2,469,890, having a viscosity of about 300 centistokes and an average chain length of about 200 dimethyl siloxane units. The mixture was then cooled to 7° C. and oxygen was bubbled through the mixture for one hour while the temperature was maintained at 7° C. After the reaction had taken place, the volatiles were removed under vacuum. The resulting oil had phosphorus attached to silicon through the —$CH_2$— radicals. Fifty grams of the resulting oil was placed in a petri dish and exposed to air for one week to form a gum. Twenty grams of this gum was compounded with 10 g. of carbon black and 1 g. of zinc oxide. The carbon black was milled into the gum followed by the addition of zinc oxide. This product was then cold pressed and allowed to stand at room temperature for three days. It was then cured twenty-four hours at 100° C. and forty-seven hours at 150° C. The resulting elastomer had a tensile strength of 560 p. s. i. and 225% elongation.

Example 3

115 g. of phosphorus trichloride was added to 165 g. of the linear starting methyl silicone oil described in Example 2. The mixture was placed in a three-neck flask equipped with a thermometer, Dry Ice condenser and gas dispersion tube for oxygen addition. Oxygen was added to the mixture over a period of five and one-half hours at such a rate that the temperature never exceeded 16° C. The volatiles were removed under vacuum, leaving a methyl silicone oil containing phosphorus attached to silicon through a —$CH_2$— radical. This oil formed a stiff gum when mixed with a small quantity of water.

Example 4

A solution of 270 g. (2.0 moles) of phosphorus trichloride and 148 g. (0.5 mole) of octamethylcyclotetrasiloxane was added to a three-neck flask equipped with a thermometer, Dry Ice condenser, and gas dispersion tube for oxygen addition. Oxygen was then bubbled into the mixture for five hours. Volatiles were stripped from the reaction mixture and a portion of the residue set to a soft gum when a few drops were added to water.

The silanes and polysiloxanes of the present invention which contain phosphorus attached to silicon through aliphatic carbon are useful per se, as insecticides, flame-proofing agents, and lubricating oil additives. These compounds are also valuable as intermediates in the preparation of high molecular weight organosilicon oils, gums, and resins which contain the polar phosphonyl dichloride radical (—$POCl_2$) attached to silicon through aliphatic carbon. The polar nature of these polymeric compounds renders them relatively insoluble in hydrocarbon solvents so that they are useful in applications requiring contact between a hydrocarbon compound and the organosilicon polymers.

What we claim as new and desire to secure by Letters Patent of the United States is:

1. The process of forming organosilicon compositions containing a phosphonyl dichloride radical attached to silicon through aliphatic carbon, which process comprises bringing into contact a mixture of ingredients comprising (1) phosphorus trichloride, (2) oxygen and (3) an organosilicon compound selected from the class consisting of (A) an organosilane containing at least one alkyl radical attached to silicon and a maximum of one member selected from the class consisting of hydrogen, halogen, alkoxy radicals, and aryloxy radicals attached to silicon, the remaining valences of silicon being satisfied by members selected from the class consisting of alkyl, aryl, alkaryl, aralkyl, and halogenated aryl radicals, and (B) an organopolysiloxane containing at least one alkyl radical attached to silicon, the remaining valences of silicon, other than the valences which make up the siloxane unit, being satisfied by members selected from the class consisting of alkyl, aryl, alkaryl, aralkyl, and halogenated aryl radicals.

2. The process of forming organosilanes containing a phosphonyl dichloride radical attached to silicon through aliphatic carbon which process comprises bringing into contact a mixture of ingredients comprising (1) phosphorus trichloride, (2) oxygen and (3) an organosilane containing at least one alkyl radical attached to silicon, and a maximum of one member selected from the class consisting of hydrogen, halogen, alkoxy radicals, and aryloxy radicals attached to silicon, the remaining valences of silicon being satisfied by members selected from the class consisting of alkyl, aryl, alkaryl, aralkyl, and halogenated aryl radicals.

3. The process of forming an organopolysiloxane containing at least one phosphonyl dichloride radical attached to silicon through aliphatic carbon, which process comprises bringing into contact a mixture of ingredients comprising (1) phosphorus trichloride, (2) oxygen and (3) an organopolysiloxane containing at least one alkyl radical attached to silicon, the remaining valences of silicon, other than the valences which make up the siloxane chain, being satisfied by members selected from the class consisting of alkyl, aryl, alkaryl, aralkyl, and halogenated aryl radicals.

4. The process of making linear organopolysiloxane compositions containing at least one phosphonyl dichloride radical attached to silicon through aliphatic carbon, which process comprises bringing into contact a mixture of ingredients comprising (1) phosphorus trichloride, (2) oxygen, and (3) a linear organopolysiloxane containing at least one alkyl radical attached directly to silicon by a C—Si linkage, with the remaining valences of silicon, other than the valences which make up the siloxane chain being satisfied by members selected from the class consisting of alkyl, aryl, alkaryl, aralkyl, and halogenated aryl radicals.

5. The process of making cyclic organopolysiloxane compositions containing a phosphonyl dichloride radical attached to silicon through aliphatic carbon, which process comprises bringing into contact a mixture of ingredients comprising (1) phosphorus trichloride, (2) oxygen, and (3) a cyclic organopolysiloxane containing at least one alkyl radical attached to silicon, the remaining valences of silicon, other than the valences which make up the siloxane chain being satisfied by members selected from the class consisting of alkyl, aryl, alkaryl, aralkyl, and halogenated aryl radicals.

6. The process of forming $(CH_3)_3SiCH_2POCl_2$ which process comprises bringing into contact a mixture of ingredients comprising (1) phosphorus trichloride, (2) oxygen and (3) tetramethylsilane.

7. The process of making a linear trimethylsilyl chain-stopped methyl silicone oil containing a phosphonyl dichloride radical attached to silicon through a —$CH_2$— radical, which process comprises bringing into contact a mixture of ingredients comprising (1) phosphorus trichloride, (2) oxygen and (3) a linear chain-stopped methyl silicone oil.

8. The process of making an organopolysiloxane elastomer, which process includes the step of bringing into contact a mixture of ingredients comprising (1) phosphorus trichloride, (2) oxygen, and (3) a linear chain-stopped organopolysiloxane oil containing at least one alkyl radical attached to silicon, with the remaining valences of silicon, other than the valences which make up the siloxane chain being satisfied by members selected from the class consisting of alkyl, aryl, alkaryl, aralkyl, and halogenated aryl radicals.

9. The process of making an organopolysiloxane elastomer which includes the step of bringing into contact a mixture of ingredients comprising (1) phosphorus trichloride, (2) oxygen, and (3) a linear chain-stopped methyl silicone oil.

10. The process of making an organopolysiloxane elastomer, which process includes the step of bringing into contact a mixture of ingredients comprising (1) phosphorus trichloride, (2) oxygen and (3) octamethylcyclotetrasiloxane.

11. A composition of matter comprising an organosilicon compound selected from the class consisting of (A) an organosilane having the general formula

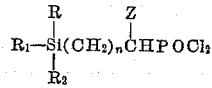

where R and $R_1$ are members selected from the class consisting of alkyl, aryl, aralkyl, alkaryl, and halogenated aryl radicals, $R_2$ is a member selected from the class consisting of hydrogen, alkyl, aryl, alkaryl, aralkyl, alkoxy, aryloxy, radicals, and halogen, Z is a member selected from the class consisting of hydrogen and alkyl radicals, and $n$ is a whole number equal to from 0 to 10, inclusive, and (B) an organopolysiloxane containing at least one phosphonyl dichloride radical attached to silicon through aliphatic carbon with the remaining valences of silicon, other than the valences which make up the siloxane chain, being satisfied by members selected from the class consisting of alkyl, aryl, alkaryl, aralkyl, and halogenated aryl radicals.

12. An organopolysiloxane containing the intercondensed siloxane unit

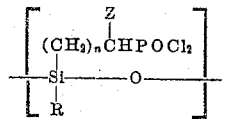

where Z is a member of the class consisting of hydrogen and alkyl radicals and R is a member of the class consisting of hydrogen, alkyl radicals, aryl radicals, alkaryl radicals, aralkyl radicals and halogenated aryl radicals, and $n$ is a whole number equal to from zero to 10, inclusive.

13. Organosilanes having the general formula

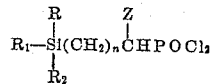

where R and $R_1$ are members of the class consisting of alkyl radicals, aryl radicals, aralkyl radicals, alkaryl radicals, and halogenated aryl radicals, $R_2$ is a member of the class consisting of hydrogen, alkyl radicals, aryl radicals, alkaryl radicals, aralkyl radicals, alkoxy radicals, aryloxy radicals, and halogen, Z is a member of the class consisting of hydrogen and alkyl radicals, and $n$ is a whole number equal to from zero to 10, inclusive.

14. A linear, chain-stopped methyl silicone oil containing at least one phosphonyl dichloride radical attached to silicon through a —$CH_2$— radical, the remaining valences of silicon, other than the valences which make up the siloxane chain being satisfied by methyl radicals.

15. Trimethylsilylmethylphosphonyl dichloride, $$(CH_3)_3SiCH_2POCl_2$$

16. An organopolysiloxane containing at least one phosphonyl dichloride radical attached to silicon through aliphatic carbon, with the remaining valences of silicon, other than the valences which make up the siloxane chain being satisfied by members selected from the class consisting of alkyl, aryl, alkaryl, aralkyl, and halogenated aryl radicals.

17. The process of making an organopolysiloxane containing a phosphonyl dichloride radical attached to silicon through a —$CH_2$ radical, which process comprises bringing into contact a mixture of ingredients comprising (1) phosphorus trichloride, (2) oxygen, and (3) a methyl polysiloxane.

18. An organopolysiloxane containing at least one phosphonyl dichloride radical attached to silicon through a —CH₃ radical, with the remaining valences of silicon, other than the valences which make up the siloxane chain, being satisfied by methyl radicals.

References Cited in the file of this patent

UNITED STATES PATENTS 2,371,068   Rochow _____ Mar. 6, 1945
2,673,210   Frisch _____ Mar. 23, 1954

OTHER REFERENCES

Clayton; J. Am. Chem. Soc., vol. 70, pp. 3880–3882 (1948).